United States Patent
Khan et al.

(10) Patent No.: US 10,698,501 B2
(45) Date of Patent: Jun. 30, 2020

(54) SYSTEMS AND METHODS FOR THREE DIMENSIONAL CONTROL OF MOBILE APPLICATIONS

(71) Applicants: SolitonReach, Inc., Columbus, OH (US); Ohio State Innovation Foundation, Columbus, OH (US)

(72) Inventors: Furrukh Khan, Dublin, OH (US); Xiaoxi Zhao, Columbus, OH (US); Anil Ozyalcin, Columbus, OH (US)

(73) Assignees: SolitonReach, Inc., Columbus, OH (US); Ohio State Innovation Foundation, Columbus, OH (US)

( * ) Notice: Subject to any disclaimer, the term of this patent is extended or adjusted under 35 U.S.C. 154(b) by 173 days.

(21) Appl. No.: 15/200,880

(22) Filed: Jul. 1, 2016

(65) Prior Publication Data
US 2017/0024024 A1      Jan. 26, 2017

Related U.S. Application Data

(60) Provisional application No. 62/221,170, filed on Sep. 21, 2015, provisional application No. 62/187,426, filed on Jul. 1, 2015.

(51) Int. Cl.
*G06F 3/0346* (2013.01)
*G06F 3/01* (2006.01)
*G06F 3/0481* (2013.01)

(52) U.S. Cl.
CPC ........... *G06F 3/0346* (2013.01); *G06F 3/017* (2013.01); *G06F 3/04815* (2013.01); *G06F 3/014* (2013.01); *G06F 2203/0382* (2013.01)

(58) Field of Classification Search
None
See application file for complete search history.

(56) References Cited

U.S. PATENT DOCUMENTS

| | | | | |
|---|---|---|---|---|
| 9,068,843 B1* | 6/2015 | Sohn | .................... | G06F 3/03 |
| 9,785,247 B1* | 10/2017 | Horowitz | ............... | G06F 3/017 |
| 2005/0253806 A1* | 11/2005 | Liberty | ................. | G06F 1/3215 |
| | | | | 345/156 |
| 2009/0070566 A1* | 3/2009 | Schreiner | .............. | G06F 1/3203 |
| | | | | 712/229 |
| 2009/0138746 A1* | 5/2009 | Klemer | ................... | G06F 1/025 |
| | | | | 713/502 |
| 2011/0254760 A1* | 10/2011 | Lloyd | .................... | G01P 15/00 |
| | | | | 345/156 |
| 2013/0222565 A1* | 8/2013 | Guerin | .................. | A61B 5/744 |
| | | | | 348/77 |

(Continued)

OTHER PUBLICATIONS

International Search Report in International Application No. PCT/US2016/040737, dated Nov. 23, 2016, 5 pages.

(Continued)

*Primary Examiner* — Stephen T. Reed
(74) *Attorney, Agent, or Firm* — Benesch, Friedlander, Coplan & Aronoff LLP

(57) ABSTRACT

The embodiments described herein relate to systems, methods, and devices for capturing arm motion. The arm motion can be transformed into a rendered object that can interact with a three dimensional scene that allows a user to intuitively grab, move, manipulate and hit objects within the scene.

37 Claims, 10 Drawing Sheets

(56) References Cited

U.S. PATENT DOCUMENTS

| | | | |
|---|---|---|---|
| 2013/0254582 A1* | 9/2013 | Wada | G06F 1/12 |
| | | | 713/375 |
| 2014/0278217 A1 | 9/2014 | Keal et al. | |
| 2015/0177020 A1* | 6/2015 | An | G01C 17/38 |
| | | | 702/92 |
| 2015/0220109 A1* | 8/2015 | von Badinski | G01P 15/00 |
| | | | 340/539.12 |
| 2015/0288687 A1* | 10/2015 | Heshmati | H04L 63/0861 |
| | | | 726/7 |
| 2016/0091955 A1* | 3/2016 | Black | G01D 9/005 |
| | | | 702/189 |
| 2016/0363460 A1* | 12/2016 | Sarbishei | G01C 25/005 |
| 2016/0378265 A1* | 12/2016 | Katsurahira | G06F 3/0418 |
| | | | 345/174 |

OTHER PUBLICATIONS

Written Opinion in International Application No. PCT/US2016/040737, dated Nov. 23, 2016, 9 pages.

* cited by examiner

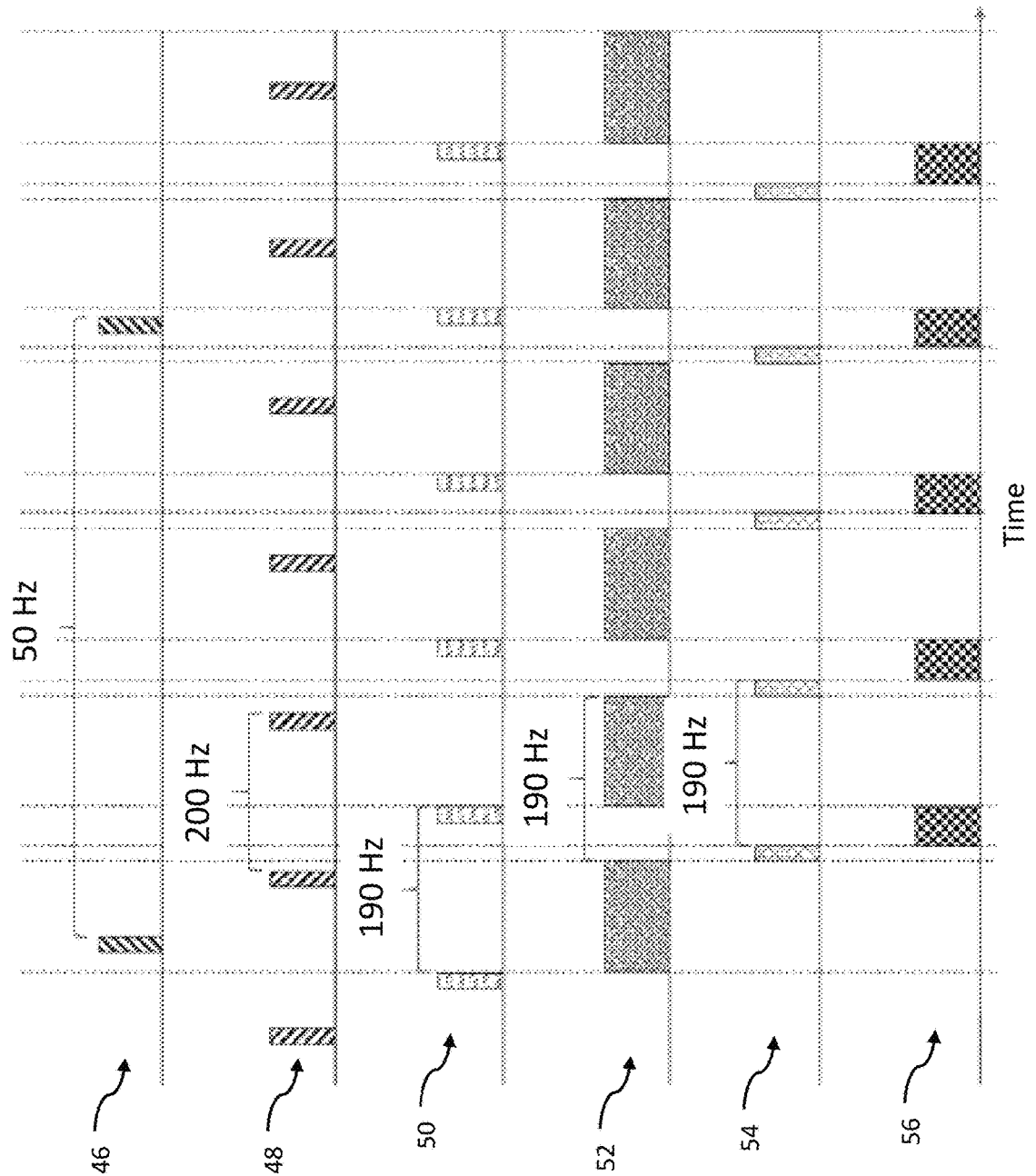

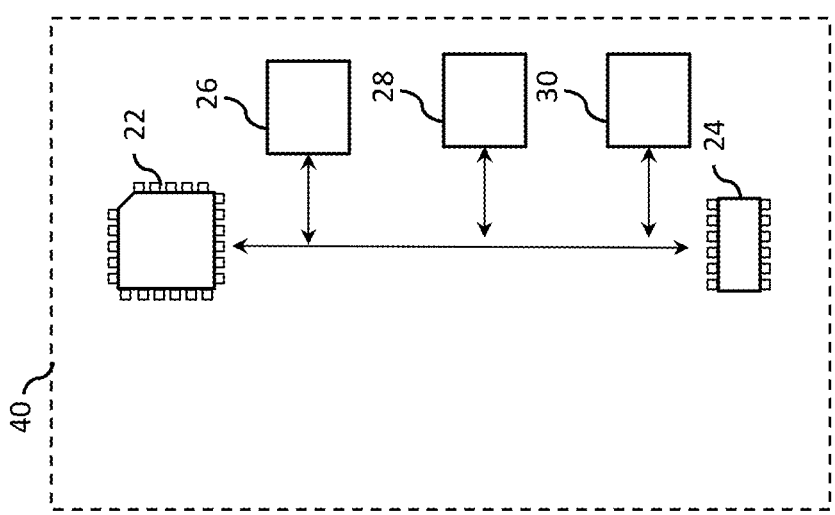

SYSTEMS AND METHODS FOR THREE DIMENSIONAL CONTROL OF MOBILE APPLICATIONS

CROSS-REFERENCE TO RELATED APPLICATIONS

U.S. Provisional Patent Application No. 62/187,426, filed on Jul. 1, 2015 and U.S. Provisional Patent Application No. 62/221,170, filed on Sep. 21, 2015, both of which are incorporated by reference herein in their entirety.

BACKGROUND

The present specification generally relates to systems and method for providing input control to a mobile device.

While some devices are available to provide motion based three dimensional input to console and personal computers (e.g., Nintendo's Wii, Microsoft's Kinect, Perception Neuron, and Leap Motion), such motion capture devices are not available for use with mobile devices. The aforementioned motion capture devices are relatively expensive as they rely upon complex sensing systems. Additionally, motion capture devices frequently require the use body suits or harnesses, which can diminish user experience. Moreover, even with the complexity of such motion capture devices, the motion capture devices frequently generate excessive amounts of sensor drift, i.e., the sensor erroneously detects motion when the user is stationary.

Accordingly, a need exists for alternative systems, methods and devices for providing input control to a mobile device

SUMMARY

According to the embodiments described herein, an inertial measurement unit (IMU) device can include an IMU sensor communicatively coupled to an IMU processer. The IMU sensor can detect orientation information. The IMU sensor can transmit the orientation information. The IMU processor can execute machine readable instructions to retrieve orientation information from the IMU sensor. An offset correction for the IMU sensor can be periodically updated. The offset correction can be updated while the IMU sensor is stationary. The orientation information can be calibrated using the offset correction. The calibrated orientation information can be transformed into an orientation signal indicative of orientation of the IMU device using a fusion algorithm. The fusion algorithm can include a gradient descent method.

In one embodiment, a mobile device can include memory and a display communicatively coupled to one or more processors. The memory can store machine readable instructions. The one or more processors can execute the machine readable instructions to receive a combined orientation signal indicative of a first Inertial Measurement Unit (IMU) device and a second IMU device. A rendered object can be rendered within a scene upon the display based upon the combined orientation signal. The scene can include a scene object and an interaction object. The interaction object can be manipulated based upon the position of the rendered object within the scene and the combined orientation signal.

In another embodiment, a method for three dimensional control can include receiving a combined orientation signal indicative of a first IMU inertial measurement unit (IMU) device and a second IMU device with one or more processors of a mobile device. A rendered object can be rendered within a scene upon a display of the mobile device based upon the combined orientation signal. The scene can include a scene object and an interaction object. The display can be communicatively coupled to the one or more processors. The interaction object can be manipulated based upon the position of the rendered object within the scene and the combined orientation signal.

In yet another embodiment, a mobile system can include a first inertial measurement unit (IMU) device, a second IMU device, and a mobile device. The first IMU device can be located at a biceps region of an arm of a user. The mobile device can include memory and a display communicatively coupled to one or more processors. The memory can store machine readable instructions. The one or more processors can execute the machine readable instructions to receive a combined orientation signal indicative of orientation of the first IMU device and the second IMU device. A rendered object can be rendered within a scene upon the display based upon the combined orientation signal. The scene can include a scene object that cannot be manipulated by the rendered object and an interaction object. The interaction object can be manipulated based upon the position of the rendered object within the scene and the combined orientation signal.

In a further embodiment, a method for three dimensional control can include receiving a combined orientation signal indicative of a first inertial measurement unit (IMU) device and a second IMU device automatically with one or more processors of a mobile device. The mobile device can include a display communicatively coupled to the one or more processors. A rendered object can be rendered, automatically with the one or more processors, within a scene upon the display of the mobile device based upon the combined orientation signal. The scene can include a scene object that cannot be manipulated by the rendered object and a plurality of interaction objects. One or more object rays can be rendered, automatically with the one or more processors, within the scene upon the display of the mobile device. The one or more object rays can extend between a nearest object of the plurality of interaction objects to the rendered object and the rendered object. The interaction object can be manipulated, automatically with the one or more processors, based upon the position of the rendered object within the scene and the combined orientation signal.

In still a further embodiment, a method for three dimensional control can include receiving a combined orientation signal indicative of a first IMU device and a second IMU device automatically with one or more processors of a mobile device. The mobile device can include a display communicatively coupled to the one or more processors. A rendered object can be rendered, automatically with the one or more processors, within a scene upon a display of the mobile device based upon the combined orientation signal. The scene can include a scene object that cannot be manipulated by the rendered object and an interaction object. A reference ray can be rendered, automatically with the one or more processors, within the scene upon the display of the mobile device. The reference ray can extend between the scene object and the rendered object. The interaction object can be manipulated, automatically with the one or more processors, based upon the position of the rendered object within the scene and the combined orientation signal.

According to any of the mobile devices, systems, or methods provided herein, the first IMU device, the second IMU device, or both can include an accelerometer, a gyroscope and a magnetometer.

According to any of the mobile devices, systems, or methods provided herein, the first IMU device can include a low power mobile interface. The first IMU device can be communicatively coupled to the mobile device via the low power mobile interface. Alternatively or additionally, the low power mobile interface can be a Bluetooth low energy (BLE) transceiver. Alternatively or additionally, the first IMU device can transmit the combined orientation signal via the low power mobile interface.

According to any of the mobile devices, systems, or methods provided herein, each of the first IMU device and the second IMU device can include low power communication hardware. The first IMU device and the second IMU device can be communicatively coupled via the low power communication hardware. Alternatively or additionally, the first IMU device can receive orientation signals from the second IMU device via the low power communication hardware. The orientation signals can be indicative of the orientation, acceleration or both of the second IMU device. Alternatively or additionally, the first IMU device can include an IMU processor that executes a fusion algorithm to generate the combined orientation signal based at least in part upon the orientation signals of the second IMU device.

According to any of the mobile devices, systems, or methods provided herein, the second IMU device can be a node IMU device configured to be attached at a forearm region of the user. Alternatively or additionally, the node IMU device can include an IMU sensor that is communicatively coupled to the IMU processor and configured to detect orientation information. Alternatively or additionally, the IMU sensor can include an accelerometer, a gyroscope and a magnetometer. Alternatively or additionally, the master IMU device can include a low power communication hardware configured to receive and transmit data signals. Alternatively or additionally, the low power communication hardware can include an ANT wireless module.

According to any of the mobile devices, systems, or methods provided herein, the rendered object can include two elongate members that are connected at a common location. Alternatively or additionally, each of the elongate members can move with the same degree of freedom as the node IMU device and the master IMU device.

According to any of the mobile devices, systems, or methods provided herein, one or more reference rays can be rendered upon the display of the mobile device. The reference rays can be configured to provide visual feedback indicative of the relative positioning between the rendered object and a scene object. Alternatively or additionally, the scene object can serve as a datum within the scene. Alternatively or additionally, each of the reference rays can project from the datum location to a position upon the rendered object. Alternatively or additionally, the scene object can include a horizontal surface.

According to any of the mobile devices, systems, or methods provided herein, one or more object rays can be rendered upon the display of the mobile device. The object rays can be configured to provide visual feedback indicative of the distance between the rendered object and the interaction object. Alternatively or additionally, the object ray can extend between the interaction object nearest to the rendered object and the rendered object. Alternatively or additionally, the interaction objects can be color coded based upon distance from the rendered object.

According to any of the mobile devices, systems, or methods provided herein, touch input of the display can receive user tactile input to control movement of the rendered object relative to the scene.

According to any of the mobile devices, systems, or methods provided herein, a third IMU device can be communicatively coupled to the first IMU device. The combined orientation signal can be indicative of orientation of the third IMU device. Alternatively or additionally, the second IMU device can be located at a forearm region of the arm of the user. The third IMU device can be located at a palm region of the user or a waist region of the user. Alternatively or additionally, a fourth IMU device can be communicatively coupled to the first IMU device. The combined orientation signal can be indicative of orientation of the fourth IMU device. Alternatively or additionally, the second IMU device can be located at a forearm region of the arm of the user, the third IMU device can be located at a biceps region of a second arm, and the fourth IMU device can be located at a forearm region of the second arm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 graphically depicts timing of an event flow according to one or more embodiments shown and described herein;

FIG. 5 schematically depicts the node IMU device of the system of FIG. 1 according to one or more embodiments shown and described herein;

DETAILED DESCRIPTION

Figure 1:
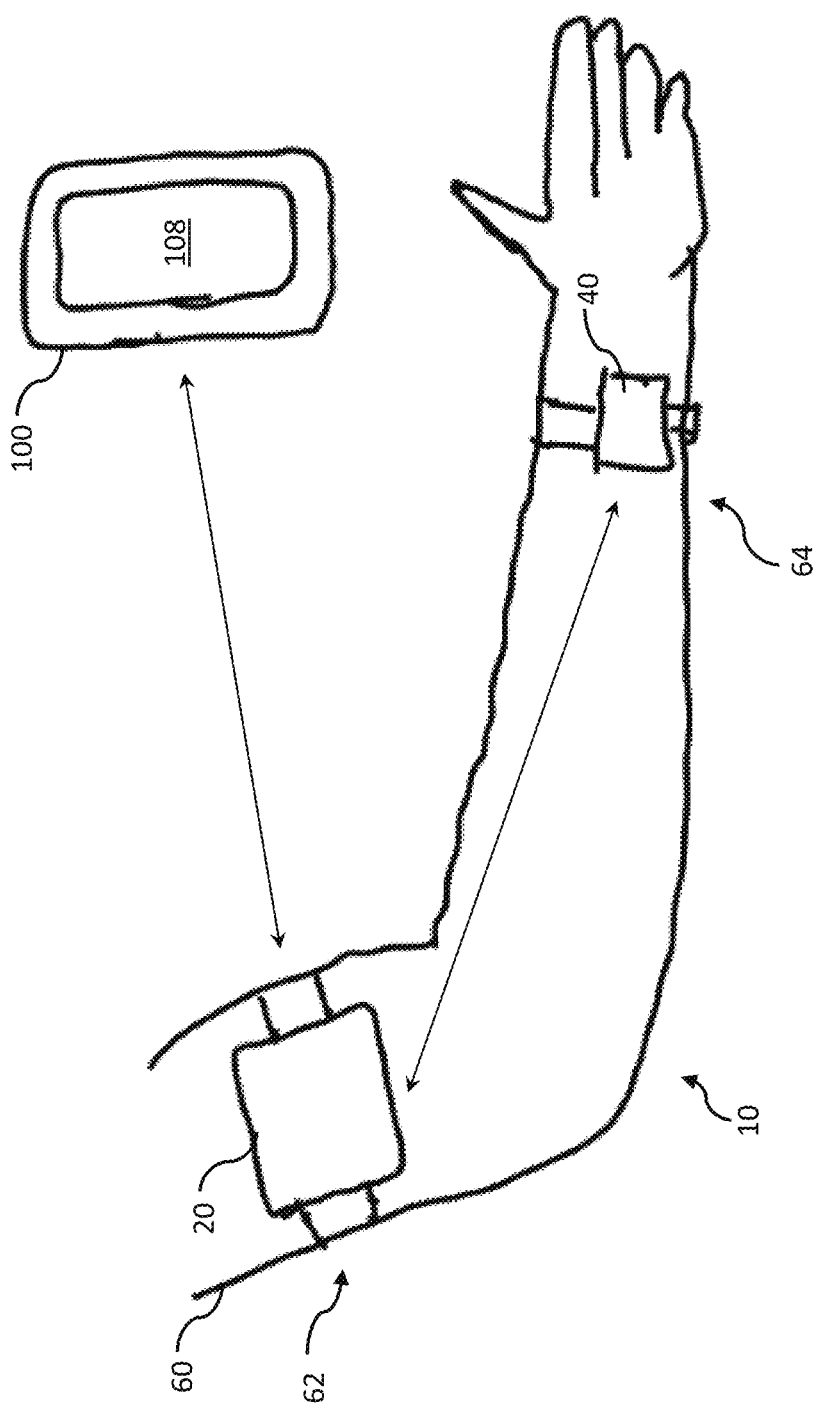
FIG. 1 schematically depicts a three dimensional control system according to one or more embodiments shown and described herein.
Figure 2:
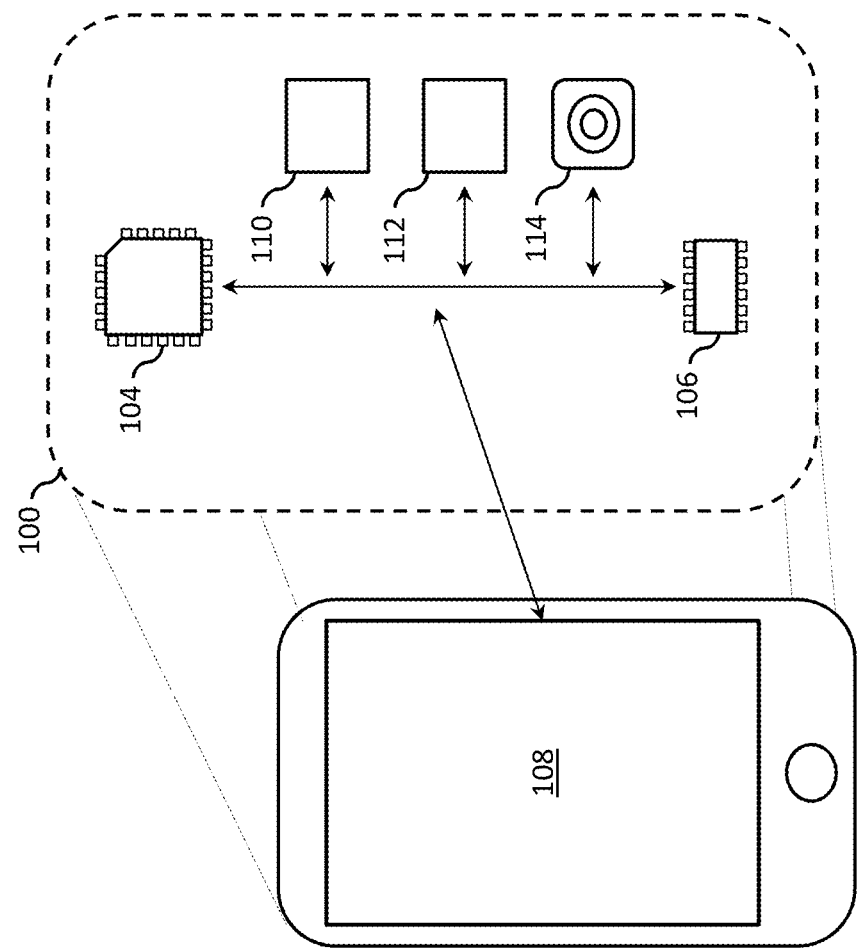
FIG. 2 schematically depicts the mobile device of the system of FIG. 1 according to one or more embodiments shown and described herein.

Referring collectively to FIGS. 1 and 2, a three dimensional control system 10 is schematically depicted. The system 10 can be configured to interact with a mobile device 100 such as, for example, to provide control input for applications running on the mobile device 100. It is noted that the description provided herein regarding the mobile device 100 is for clarity, and is not intended to limit the description to any specific machine. Various machines can be utilized without departing from the scope of the embodiments described herein such as, for example, a smart phone, a tablet, or the like. The mobile device 100 can comprise one or more processors 104 for executing machine readable instructions to perform functions according to the methods described herein. As used herein, the term "processor" can mean any device capable of executing machine readable instructions. Accordingly, each processor can be a controller, an integrated circuit, a microchip, or any other device capable of implementing logic. Specific examples of the one or more processors 104 can include a touch screen controller, a baseband controller, graphics processor, application processor, image processor, or the like.

The mobile device 100 can comprise memory 106 communicatively coupled to the one or more processors 104 (generally depicted as double arrowed lines). The memory 106 described herein may be RAM, ROM, a flash memory, a hard drive, or any device capable of storing machine readable instructions. Accordingly, the mobile device 100 can implement a mobile operating system as machine readable instructions stored on the memory 106 and executed by the one or more processors 104. Specific examples of mobile operating systems include, but are not limited to, Android, iOS, Blackberry OS, Windows Phone, Symbian, and the like.

Additionally, it is noted that the functions, modules, and processes described herein can be provided as machine readable instructions stored on the memory 106 and executed by the one or more processors 104. The machine readable instructions can be provided in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the functions, modules, and processes described herein may be written in a hardware description language (HDL), such as logic implemented via either a field-programmable gate array (FPGA) configuration or an application-specific integrated circuit (ASIC), and their equivalents. Accordingly, the functions, modules, and processes described herein may be implemented in any conventional computer programming language, as pre-programmed hardware elements, or as a combination of hardware and software components (e.g., firmware components).

The mobile device 100 can comprise a display 108 communicatively coupled to the one or more processors 104 for providing optical signals and conveying visual feedback to users of the mobile device. In some embodiments, the display 108 can be configured to selectively illuminate a plurality of pixels to provide the optical signals. Accordingly, the display can comprise light emitting diodes (LED or OLED), liquid crystal display (LCD), liquid crystal on silicon (LCOS), or the like. Additionally, the display 108 can be configured to operate as a touch screen for accepting input via visual controls. Accordingly, the display 108 can comprise a touch detector such as, for example, a resistive sensor, capacitive sensor, or the like. It is noted that the display 108 of mobile device 100 can be defined by a screen size of less than about 10 inches in one embodiment such as, for example, less than or equal to about 9.7 inches in another embodiment, less than or equal to about 7.9 inches in another embodiment, or less than or equal to about 5.7 inches in another embodiment. It is furthermore noted that the term "signal," as used herein, can mean a waveform (e.g., electrical, optical, magnetic, or electromagnetic), such as DC, AC, sinusoidal-wave, triangular-wave, square-wave, and the like, capable of traveling through a medium.

Referring still to FIGS. 1 and 2, the mobile device 100 can comprise network interface hardware 110 communicatively coupled to the one or more processors 104 for communicatively coupling the mobile device 100 to another device via a network such as, for example, a wide area network, a local area network, personal area network, a global positioning system and combinations thereof. Accordingly, the network interface hardware 110 can be configured to communicate, i.e., send and/or receive data signals via any wired or wireless communication protocol. For example, the network interface hardware 110 can comprise an antenna, a modem, LAN port, wireless fidelity (Wi-Fi) card, WiMax card, near-field communication hardware, satellite communication hardware, or the like. Accordingly, the mobile device 100 can be communicatively coupled to a network via wires, via a wide area network, via a local area network, via a personal area network, via a satellite network, or the like. Suitable local area networks can comprise wired ethernet and/or wireless technologies such as, for example, Wi-Fi. Suitable personal area networks can comprise wireless technologies such as, for example, IrDA, Bluetooth, Bluetooth low energy (BLE), Wireless USB, Z-WAVE, ZIGBEE, or the like. Alternatively or additionally, suitable personal area networks may include wired computer buses such as, for example, USB and FIREWIRE. Thus, any components of the mobile device can utilize one or more network components to communicate signals via the Internet or World Wide Web.

The mobile device 100 can comprise radio frequency hardware (RF hardware) 112 communicatively coupled to the one or more processors 104 for communicatively coupling the mobile device 100 with a cellular network. Suitable cellular networks include, but are not limited to, technologies such as LTE, WiMAX, UMTS, CDMA, and GSM. In some embodiments, the RF hardware 112 can comprise components suitable for communicating voice information and data signals such as, for example, modems, attenuators, antennas, antenna switches, amplifiers, receivers, transceivers, or combinations thereof. Accordingly, the smart phone 102 described herein can utilize a cellular network to communicate signals over the Internet or World Wide Web. Thus, each of the network interface hardware 110 and the RF hardware 112 can be utilized separately or in combination as communication hardware.

The mobile device 100 can comprise an optical sensor 114 communicatively coupled to the one or more processors 104 for detecting optical signals and encoding the detected signals into an image or collection of images (e.g., video). It should be understood that the term "optical" can refer to various wavelengths of the electromagnetic spectrum such as, but not limited to, wavelengths in the ultraviolet (UV), infrared (IR), and visible portions of the electromagnetic spectrum. In some embodiments, the optical sensor 114 can comprise semiconductor charge-coupled devices (CCD), complementary metal-oxide-semiconductors (CMOS), N-type metal-oxide-semiconductors (NMOS), or the like. Accordingly, one or more images can be captured by the optical sensor 114 and stored in the memory 106. In addition to the aforementioned components, the mobile device 100 can comprise one or more additional components communicatively coupled to the one or more processors 104 without departing from the scope of the embodiments described herein. Suitable additional components include, but are not limited to, a speakers, a gyroscope, accessory lights (e.g., LED), an accelerometer, input components (e.g., buttons, switches, knobs, microphone) or the like.

Figure 3:
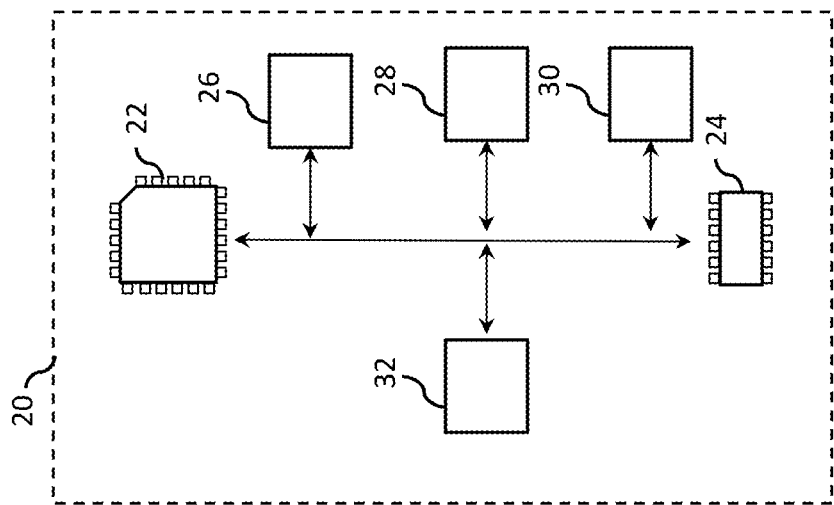
FIG. 3 schematically depicts the master IMU device of the system of FIG. 1 according to one or more embodiments shown and described herein.

Referring collectively to FIGS. 1 and 3, the system 10 can comprise a master Inertial Measurement Unit (IMU) device 20 that is configured to be attached to an arm 60 of a user. Specifically, the master IMU device 20 can be configured to be attached at a biceps region 62 of the user such as, for example, at or near the biceps or between the shoulder and the elbow of the arm 60. Accordingly, the master IMU device 20 can comprise an attachment member such as a band, a strap, or the like that is sized for the biceps.

The master IMU device 20 can be configured to provide orientations signals indicative of the orientation of the master IMU device 20. As illustrated in FIG. 3, the master IMU device 20 can comprise an IMU processor 22 communicatively coupled to memory 24. In some embodiments, the IMU processor 22 can be powered by a battery 26. In order to extend the operation period of the master IMU device 20, the IMU processor 22 can be a device that is energy efficient such as, for example, an ultra-low power microcontroller such as, for example, the MSP430 microcontroller by Texas Instruments of Dallas, Tex., U.S.A. Additionally, the master IMU device 20 can comprise an IMU sensor 28 that is communicatively coupled to the IMU processor 22 and configured to detect orientation information. In some embodiments, the IMU sensor 28 can comprise an accelerometer, a gyroscope and a magnetometer, which can each provide 3-axis data. Each component of the IMU sensor 28 can be provided as a separate component or as a system in a package that integrates the accelerometer, the gyroscope and the magnetometer in a monolithic solution such as, for example, the 9-axis inertial modules by ST Microelectronics of Geneva, Switzerland. In such embodiments, the orientation information can be detected by fusion of the IMU sensor 28 data. In some embodiments, the each sensor of the IMU sensor 28 can communicate with the IMU processor 22 with a dedicated interrupt line that notifies the IMU processor 22 when new data is ready. Using interrupts can eliminate polling of the sensors and improve power consumption.

For example, the IMU processor 22 can process the orientation information of the IMU sensor 28 according to a fusion algorithm stored on the memory 24. Suitable fusion algorithms include, but are not limited to, gradient descent method (e.g., the Madgwick Sensor Fusion Algorithm), Kalman filter, extended Kalman filters, or the like. Accordingly, the orientation information of the IMU sensor 28 can be transformed into orientation signals indicative of the orientation, acceleration or both of the master IMU device 20.

According to the embodiments provided herein, each axis of the IMU sensor 28 can be calibrated using known energy sources, i.e., angular velocity, gravity, magnetic field, or the like. For example, the IMU sensor 28 can be calibrated to correct for offset errors and scale errors by tuning the master IMU device 20 upon manufacture. For example, an offset correction, a scale correction, or both can be provided in memory 24 based upon the calibration. Accordingly, the IMU processor 22 can calibrate the orientation information of the IMU sensor 28 prior to using the orientation information in the fusion algorithm. The offset correction can be configured to compensate for the difference between the IMU sensor 28 output when not stimulated. Accordingly, the offset correction can be determined by averaging the output of the IMU sensor 28 over an unstimulated period of time. The scale correction can be configured to compensate for scale errors to a known source of energy. For example, the scale correction can be determined by first correcting the IMU sensor 28 output for offset errors, and then taking the ratio of the offset-corrected output of the IMU sensor 28 output to the known source of energy.

In addition to calibration upon manufacture, the offset correction can be updated for one or more of the components of the IMU sensor 28 prior to executing the fusion algorithm. In some embodiments, the IMU processor 22 can periodically execute an offset calibration routine such as, for example, upon startup of the master IMU 20, at predetermined time intervals, or the like. Accordingly, the IMU processor 22 can periodically update the offset correction for the gyroscope of the IMU sensor 28 by, for example, averaging the gyroscope output for a predetermined period of time while the master IMU 20 is substantially stationary. Alternatively or additionally, the offset calibration routine can include executing multiple iterations of the fusion algorithm while the master IMU 20 is substantially stationary. Without being bound to theory, it is believed that performing the offset calibration routine for the gyroscope can improve the drift performance of the embodiments provided herein, i.e., the offset calibration routine may contribute to substantially drift free behavior.

According to the embodiments described herein, the execution time of the gradient descent method can be improved (i.e., computational time decreased) by using fixed point math functions instead of floating point math functions. For example, square root operations, arithmetic, matrix operations, or combinations thereof can be performed with fixed point functions. Unexpectedly, the overall performance of the fusion algorithm can be improved with fixed point math. For example, the Madgwick Sensor Fusion Algorithm was modified by replacing floating point arithmetic functions and square root functions with fixed point functions. Accordingly, the ultra-low power microcontroller can use software implemented fixed point functions to improve the orientation accuracy, speed of the algorithm, and power consumption compared to the use of floating point software functions on the ultra-low power microcontroller. Moreover, the software implemented fixed point functions on the ultra-low power microcontroller can consume less power and have a smaller form factor than microcontrollers having hardware implemented floating point functions.

Referring still to FIGS. 1 and 3, the master IMU device 20 can comprise low power communication hardware 30 configured to receive and transmit data signals, while consuming a relatively low amount of power. The low power communication hardware 30 can be communicatively coupled to the IMU processor 22. Accordingly, the IMU processor 22 can communicate orientation signals with the low power communication hardware 30. For example, the IMU processor 22 can execute the fusion algorithm to process orientation information of the IMU sensor 28 as the information is generated, and relay the orientation signals to the low power communication hardware 30.

Referring collectively to FIGS. 3 and 4, without being bound to theory, it is believed that the event flow of the embodiments described herein can provide improved performance of the gradient descent method. In some embodiments, the IMU sensor 28 can communicate three interrupts indicative of data being available to the IMU processor 22, i.e., magnetometer events 46, accelerometer events 48, and gyroscope events 50. When orientation information is sampled and ready to be transmitted by the IMU sensor 28, an interrupt can be provided to the IMU processor 22. The IMU processor 22 can be configured to receive the orientation information from the IMU sensor 28 and store the data in memory 24 responsive to each interrupt. In some embodiments, each falling edge of the magnetometer event 46, the accelerometer event 48, and the gyroscope event 50 can trigger a corresponding interrupt.

Additionally, the fusion algorithm can be executed by the IMU processor 22 as a fusion algorithm process 52. The fusion algorithm process 52 can be executed in parallel to orientation information retrieval from the IMU sensor 28. Accordingly, the orientation information can be updated from the IMU sensor 28 and the fusion algorithm process 52 can use the most recently sampled orientation information to determine the orientation signals. It is noted that, in some embodiments, the magnetometer events 46, the accelerometer events 48, and the gyroscope events 50 can be provided at different rates. Specifically, each modality of the IMU sensor 28 can be sampled at different rates. Accordingly, the performance of the fusion algorithm can be improved by synchronizing the fusion algorithm process 52 to one of the interrupts, which allows for the orientation information from the IMU sensor 28 to be supplied to the fusion algorithm process 52 with substantially consistent intervals. Such synchronization can reduce the occurrence of missing or skipped instances of the orientation information. Thus, the integration performed by the fusion algorithm and the orientation estimation can be improved through synchronization.

In some embodiments, the IMU processor 22 can iteratively perform the fusion algorithm process 52, a data relay process 54, and a power saving process 56 at substantially consistent periods that are synchronized to one of the interrupts. The orientation signals can be communicated to the low power communication hardware 30 during the data relay process 54. Power consumption can be reduced by operating the IMU processor 22 in a low power mode during the power saving process 56. Generally, the fusion algorithm process 52 has the largest execution time (e.g., less than about 4 ms in the embodiment depicted in FIG. 4). Accordingly, lack of synchronization can cause other interrupts to be ignored until the fusion algorithm process 52 is completed, which can decrease performance. Additionally, lack of synchronization can cause the data relay processes 54 to be missed by the IMU processor 22, which can lead to lack of functionality.

In embodiments where the fusion algorithm process 52 takes less time than the period between samples of the IMU sensor 28, the orientation accuracy can be improved because the orientation information is used in a timely manner. In some embodiments, the magnetometer events 46 can occur at about 50 Hz, the accelerometer events 48 can occur at about 200 Hz, and the gyroscope events 50 can occur at about 190 Hz. When the fusion algorithm process 52 is synchronized to the gyroscope events 50, the fusion algorithm process 52 can be started at about 190 Hz. Since the fusion algorithm process 52 process takes less time to execute than the period between the gyroscope events 50, power consumption can be reduced during the remainder of the period between gyroscope events 50. Specifically, the utilization of the IMU processor 22 can be about 75%, when the fusion algorithm process 52 takes about 3.7 ms to execute. Moreover, with increased frequency of operation, the orientation accuracy of the fusion algorithm can be improved. Additionally, it is noted that in some embodiments, accuracy can be increased by synchronizing the fusion algorithm process 52 to the event with the fastest sampling rate.

Referring collectively to FIGS. 1 and 3, the master IMU device 20 can be configured to receive orientation signals from one or more additional devices. In some embodiments, the low power communication hardware 30 can comprise an ANT wireless module by Dynastream Innovations Inc. of Cochrane, Canada. Each ANT wireless module can comprise a low powered RF transceiver. The ANT wireless module can be configured to as a node to interconnect with other nodes, i.e., to interconnect with multiple ANT wireless modules.

For example, the master IMU device 20 can be configured to receive orientation signals from a node IMU device 40 that are indicative of the orientation, acceleration or both of the node IMU device 40. Specifically, the low power communication hardware 30 of the master IMU device 20 can receive the orientation signals from the node IMU device 40 and provide the orientation signals of the node IMU device 40 to the IMU processor 22 of the master IMU device 20. The fusion algorithm of the master IMU device 20 can be configured to process the orientation information of the master IMU device 20 and the node IMU device 40 and provide a combined orientation signal indicative of the orientation, acceleration or both of the node IMU device 40 and the master IMU device 20.

Referring collectively to FIGS. 1, 3 and 5, the node IMU device 40 of the system 10 can be configured to be attached to the arm 60 of the user. Specifically, the node IMU device 40 can be configured to be attached at a forearm region 64 of the user such as, for example, at or near the forearm, or between the wrist and the elbow of the arm 60. Accordingly, the node IMU device 40 can comprise an attachment member such as a band, a strap, or the like that is sized for the forearm. Alternatively or additionally, the node IMU device 40 can be configured to be attached at a palm region 66 of the user.

The node IMU device 40 can be configured to provide orientations signals indicative of the orientation, acceleration, or both of the node IMU device 40. The node IMU device 40 can comprise an IMU processor 22 communicatively coupled to memory 24, a battery 26, an IMU sensor 28, and low power communication hardware 30, as is described above with respect to the master IMU device 20. Accordingly, the IMU processor 22 can utilize the fusion algorithm to transform orientation information of the IMU sensor 28 into orientations signals of the node IMU device 40. As is noted above, the low power communication hardware 30 of the master IMU device 20 and the node IMU device 40 can be communicatively coupled. Thus, the orientation signals of the node IMU device 40 can be transmitted to the master IMU device 20.

Referring collectively to FIGS. 1-3, the master IMU device 20 can further comprise a low power mobile interface 32 that is configured to be communicatively coupled to the network interface hardware 110 of the mobile device 100. The low power mobile interface 32 can be communicatively coupled to the IMU processor 22. Accordingly, the low power mobile interface 32 can be configured to transmit the combined orientation signal indicative of the node IMU device 40 and the master IMU device 20 to the mobile device 100 via the network interface hardware 110. In some embodiments, the low power mobile interface 32 can be communicatively coupled to the network interface hardware 110 via a personal area network. In one embodiment, the low power mobile interface 32 can comprise a Bluetooth low energy (BLE) transceiver. It is noted that BLE can be contrasted with "classic" Bluetooth communications. For example, BLE can have lower data transfer rates and shorter range than Bluetooth communications. The embodiments described herein utilize the combined orientation signal, which provides the system orientation information efficiently, to transfer orientation information at lower transfer rates. Such efficient or compressed transfer orientation information allows the system 10 to consume less power via BLE, as compared to an implementation utilizing "classic" Bluetooth.

Referring collectively to FIGS. 3-7, according to the embodiments described herein, a three dimensional control system 12 can comprise the master IMU device 20, the node IMU device 40, and a second node IMU device 42. The low power mobile interface 32 of the master IMU device 20 can be communicatively coupled to the network interface hardware 110 of the mobile device 100. The second node IMU device 42 can comprise the IMU processor 22 communicatively coupled to memory 24, the battery 26, the IMU sensor 28, and the low power communication hardware 30, as is described above with respect to the node IMU device 20. The low power communication hardware 30 of the master IMU device 20 can be communicatively coupled to the low power communication hardware 30 of each of the node IMU device 40, and the second node IMU device 42. The orientation signals of the node IMU device 40 and the second node IMU device 42 can be transmitted to the master IMU device 20. The low power communication hardware 30 of the master IMU device 20 can receive the orientation signals from the node IMU device 40 and the second node IMU device 42. The orientation signals can be provided to the fusion algorithm of the master IMU device 20. The combined orientation signal can be determined from the orientation information of the master IMU device 20, the node IMU device 40, and the second node IMU device 42. The combined orientation signal indicative of the orientation, acceleration or both of the master IMU device 20, the node IMU device 40, and the second node IMU device 42. Accordingly, the combined orientation signal can provide orientation information corresponding to the orientation, acceleration or both of three different regions of the body of the user.

Figure 6:
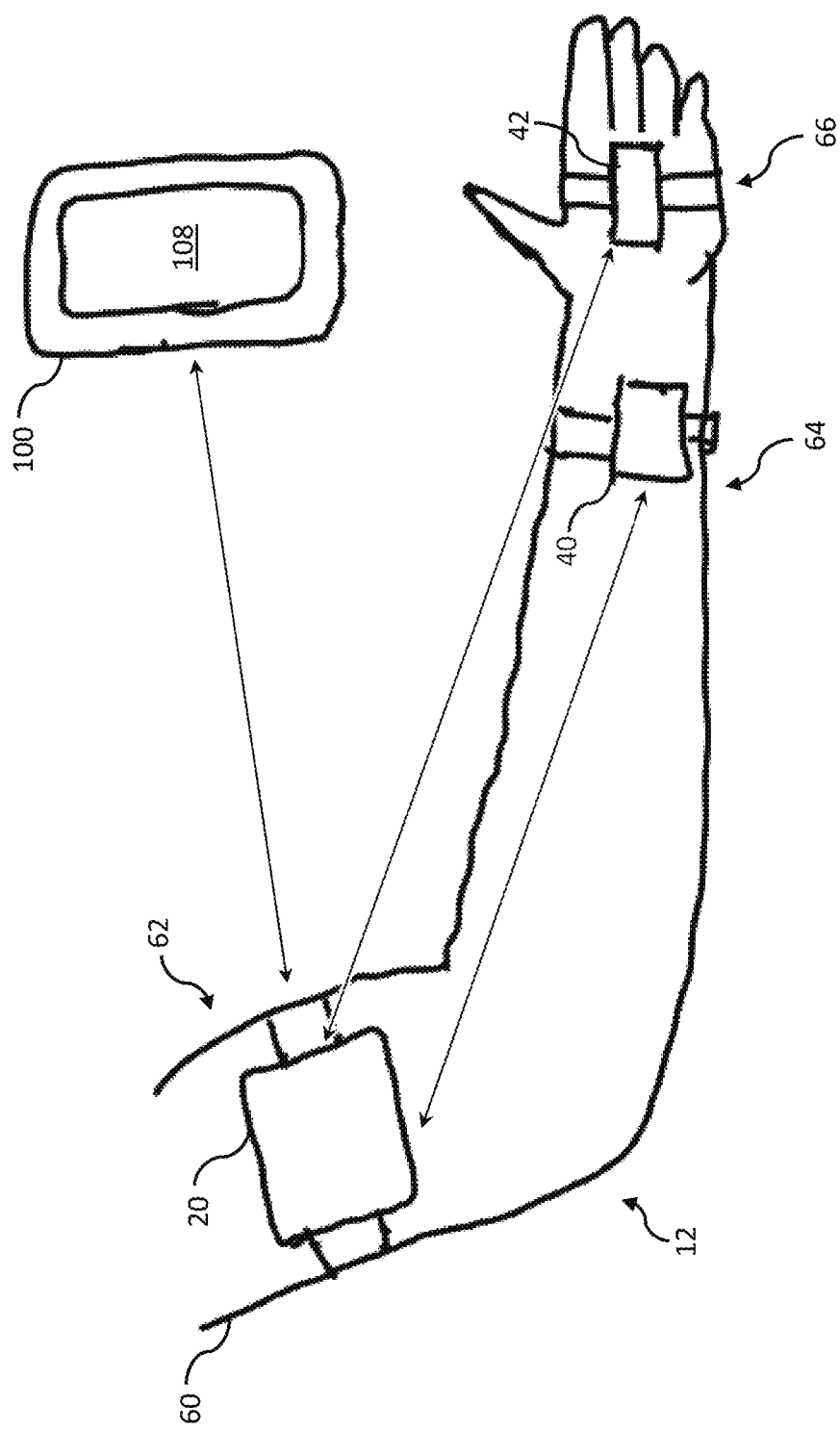
FIGS. 6 and 7 schematically depict a three dimensional control system according to one or more embodiments shown and described herein.

In some embodiments of the system 12, as depicted in FIG. 6, the master IMU device 20 can be attached to the biceps region 62 of the user and the node IMU device 40 can be attached at a forearm region 64 of the user. The second node IMU device 42 can be attached at a palm region 66 of the user such as, for example, at or near the hand of the user or between the wrist and finger tips of the user. Accordingly, the second node IMU device 42 can comprise an attachment member such as a band, a strap, or the like that is sized for the hand. Accordingly, the combined orientation signal of the system 12 can be indicative of the orientation of the biceps region 62, the forearm region 64, and the palm region 66 of the user.

Figure 7:
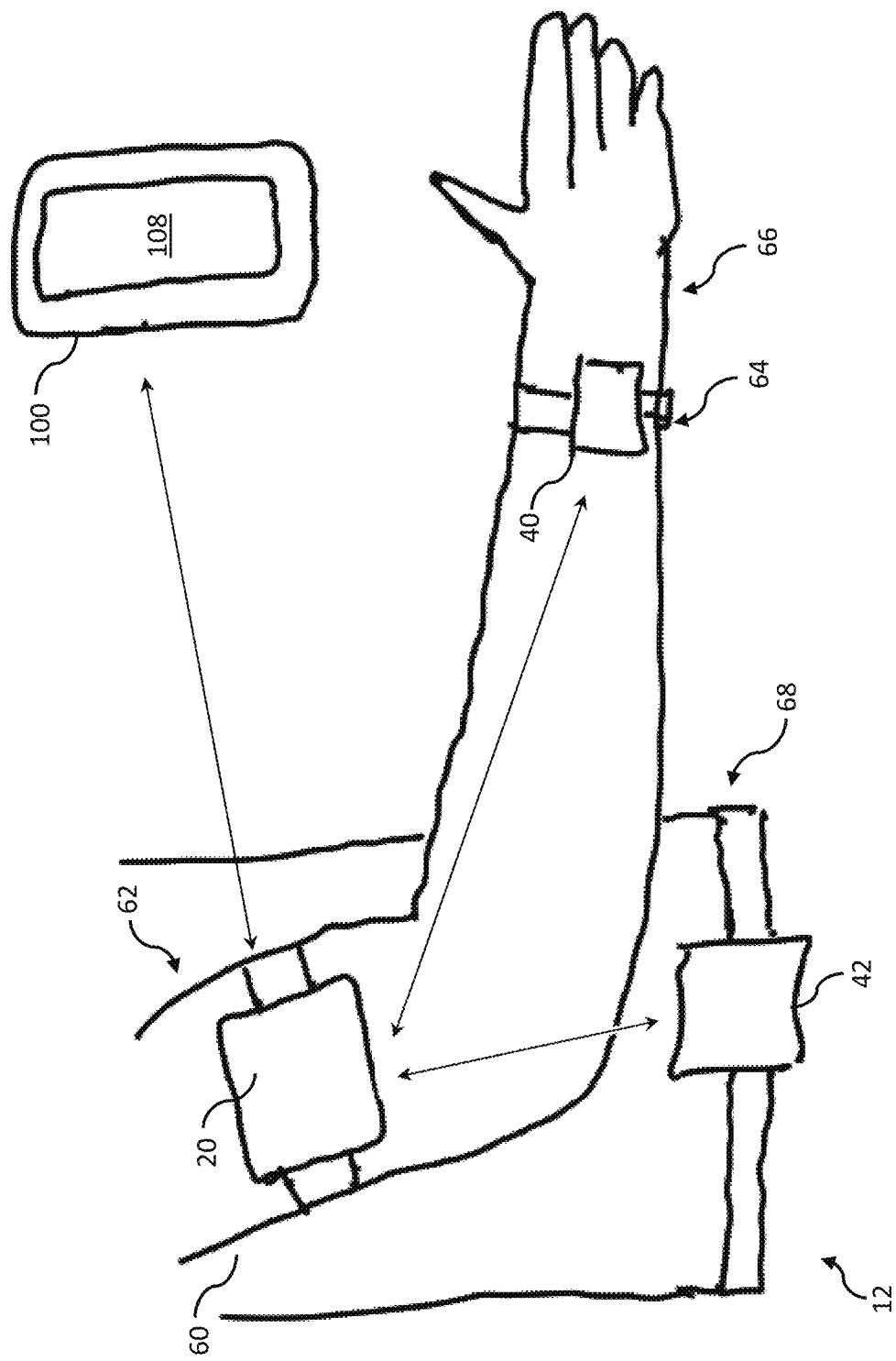

As depicted in FIG. 7, the second node IMU device 42 of the system 12 can be attached at a waist region 68 of the user such as, for example, at or below the umbilicus of the user. Accordingly, the second node IMU device 42 can comprise an attachment member such as a band, a strap, or the like that is sized for the waist. Accordingly, the combined orientation signal of the system 12 can be indicative of the orientation of the biceps region 62, the forearm region 64, and the waist region 68 of the user.

Figure 8:
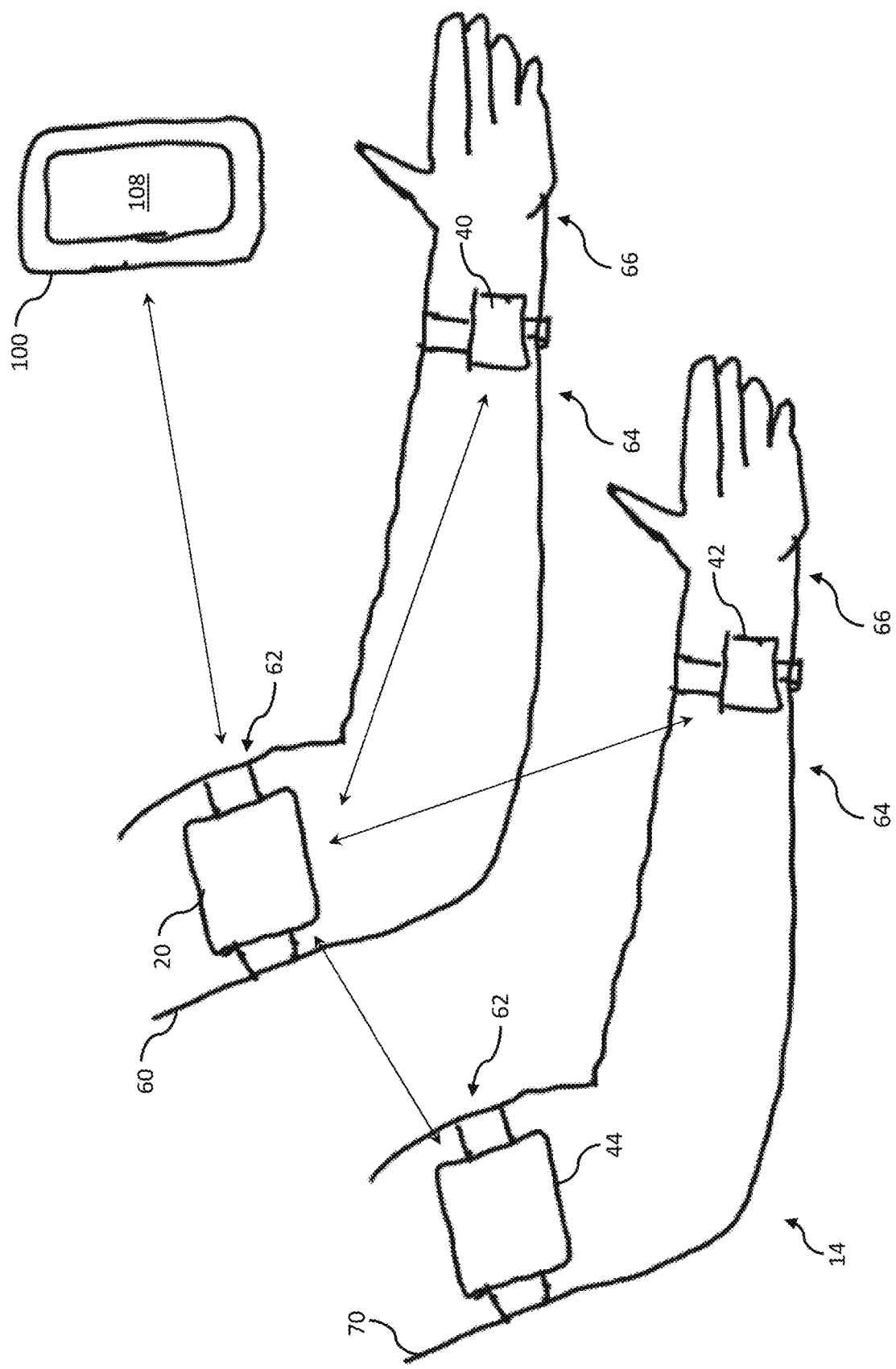
FIG. 8 schematically depicts a three dimensional control system according to one or more embodiments shown and described herein.

Referring collectively to FIGS. 3, 5, and 8, according to the embodiments described herein, a three dimensional control system 14 can comprise the master IMU device 20, the node IMU device 40, and the second node IMU device 42, and a third node IMU device 44. The low power mobile interface 32 of the master IMU device 20 can be communicatively coupled to the network interface hardware 110 of the mobile device 100. The third node IMU device 44 can comprise the IMU processor 22 communicatively coupled to memory 24, the battery 26, the IMU sensor 28, and the low power communication hardware 30, as is described above with respect to the node IMU 20. The low power communication hardware 30 of the master IMU device 20 can be communicatively coupled to the low power communication hardware 30 of each of the node IMU device 40, the second node IMU device 42, and the third node IMU device 44. The orientation signals of the node IMU device 40, the second node IMU device 42, and the third node IMU device 44 can be transmitted to the master IMU device 20. The low power communication hardware 30 of the master IMU device 20 can receive the orientation signals from the node IMU device 40, the second node IMU device 42, and the third node IMU device 44. The orientation signals can be provided to the fusion algorithm of the master IMU device 20. The combined orientation signal can be determined from the orientation information of the master IMU device 20, the node IMU device 40, the second node IMU device 42, and the third node IMU device 44 such that the combined orientation signal is indicative of the orientation, acceleration or both of the master IMU device 20, the node IMU device 40, the second node IMU device 42, and the second node IMU device 44. Accordingly, the combined orientation signal can provide orientation information corresponding to the orientation, acceleration or both of the arm 60 of the user and a second arm 70, which can be of the user or a second user.

According to the embodiments described herein, the master IMU device 20 can be attached to the biceps region 62 of the arm 60 and the node IMU device 40 can be attached at a forearm region 64 of the arm 60. The second node IMU device 42 can be attached at the palm region 66 of the second arm 70 and the third node IMU device 44 can be attached at the biceps region 62 of the second arm 70. In embodiments where the arm 60 and the second arm 70 belong to a single user, the combined orientation signal can provide control input to an application configured for a single user. In embodiments where the arm 60 belongs to a first user and the second arm 70 belongs to a second user, the combined orientation signal can provide control input to an application configured for a two users. It is noted that, while embodiments are described as including a particular number of IMU devices, the IMU devices can be configured to operate as a full body detection system. The full body detection system can include any number of IMU devices such as, for example, up to the quantity of devices supported by the bandwidth of the low power mobile interface 32. For example, in embodiments where the low power mobile interface 32 comprises a BLE transceiver, up to about twelve IMU devices can be used.

Referring again to FIGS. 1 and 2, embodiments of the system 10 can be communicatively coupled to the mobile device 100 to provide three dimensional functionality to applications running on the mobile device 100. The methods described herein generally relate to functionality that can be provided via an associated software development kit (SDK). For example, the SDK can provide building blocks or selectable processes that can be added to applications developed according to other software frameworks such as, for example, UNITY game engine, Unreal Engine 4 game engine, Microsoft augmented reality devices, Magic Leap, Corona SDK, Marmalade SDK, iOS SDK, Android SDK, or the like. Accordingly, any of the processes described herein can be eliminated or reordered without departing from the scope of the methods provided herein.

Referring collectively to FIGS. 1, 2, 8, 9 and 10, the embodiments provided herein further relate to a method 200 which can automatically be executed by the mobile device 100 for providing three dimensional control of the mobile device 100. The method 200 can comprise a process 202 for receiving control input. At process 202, the combined orientation signal indicative of the orientation, acceleration or both of the node IMU device 40 and the master IMU device 20 can be received by the network interface hardware 110 and communicated to the one or more processors 104. Additionally, the combined orientation signal can be indicative of the orientation, acceleration or both of the second node IMU device 42, the third node IMU device 44, or both. Accordingly, the control input can be utilized for applications receiving input from one or more users. The method 200 can proceed to process 204.

At process 204, the one or more processors 104 can render a rendered object 210 upon the display 108 of the mobile device 100. Generally, the rendered object 210 can be based or dependent upon the combined orientation signal. In some embodiments, the rendered object 210 can be structurally similar to the arm 60 or the arm 70. For example, the object can have two elongate members that are connected at a common location. Each of the elongate members can move with the same degree of freedom as the node IMU device 40 and the master IMU device 20. Accordingly, the rendered object 210 can be rendered such that the rendered object 210 is oriented according to the combined orientation signal. In some embodiments, the elongate members can be mapped to a skeletal mesh and forward kinematics can be utilized to compute the position of the elongate members based upon the combined orientation signal. Thus, as the method 100 iterates, the rendered object 210 can be rendered to mimic motion of the node IMU device 40 and the master IMU device 20. It is noted that the rendered object 210 can correspond to a skeletal mesh that comprises a number of elongate members corresponding to the number of IMU devices.

Referring collectively to FIGS. 6, 7, 9, and 10, the rendered object 210 can comprise components that are manipulated according to some portion of the combined orientation signal. Specifically, each component can be manipulated according to the master IMU device 20, the node IMU device 40, the second node IMU device 42, the third node IMU device 44, or any combination thereof. In one embodiment, the master IMU device 20, the node IMU device 40, and the second node IMU device 42 of the system 12 can be utilized to move the rendered object 210. Accordingly, the rendered object 210 can be rendered to mimic the motion of biceps region 62, the forearm region 64, and the palm region 66. For example, if the rendered object 210 corresponds to a rendered arm, a biceps, a forearm, and a wrist of the rendered arm can be manipulated upon the display 108 in accordance with the arm 60 of the user. Alternatively, the rendered object 210 can be rendered to mimic the motion of the biceps region 62, the forearm region 64, and the waist region 66.

Referring again to FIG. 8, multiple rendered objects can be manipulated upon the display 108 according to the combined orientation signal. In some embodiments, one of the multiple rendered objects can be rendered such that the object is oriented according to the combined orientation signal corresponding to the node IMU device 40 and the master IMU device 20. Alternatively or additionally, one of the multiple rendered objects can be rendered such that the object is oriented according to the combined orientation signal corresponding to the second node IMU device 42 and the third node IMU device 44. Accordingly, multiple rendered objects can be manipulated according to the orientation of the arm 60 and the second arm 70.

Figure 9:
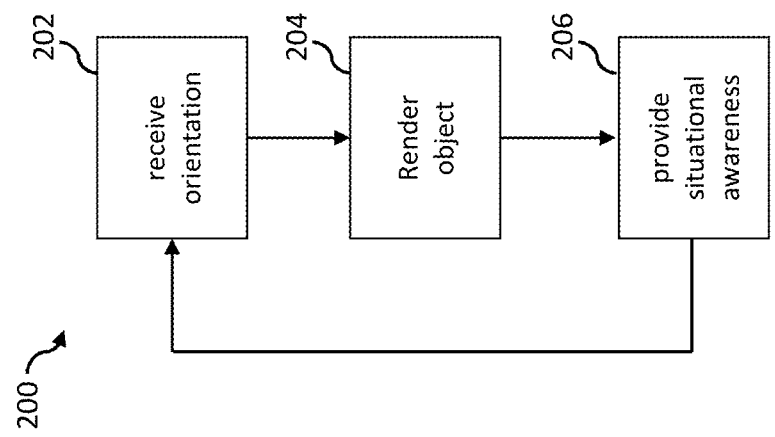
FIG. 9 schematically depicts a method for providing three dimensional control according to one or more embodiments shown and described herein.
Figure 10:
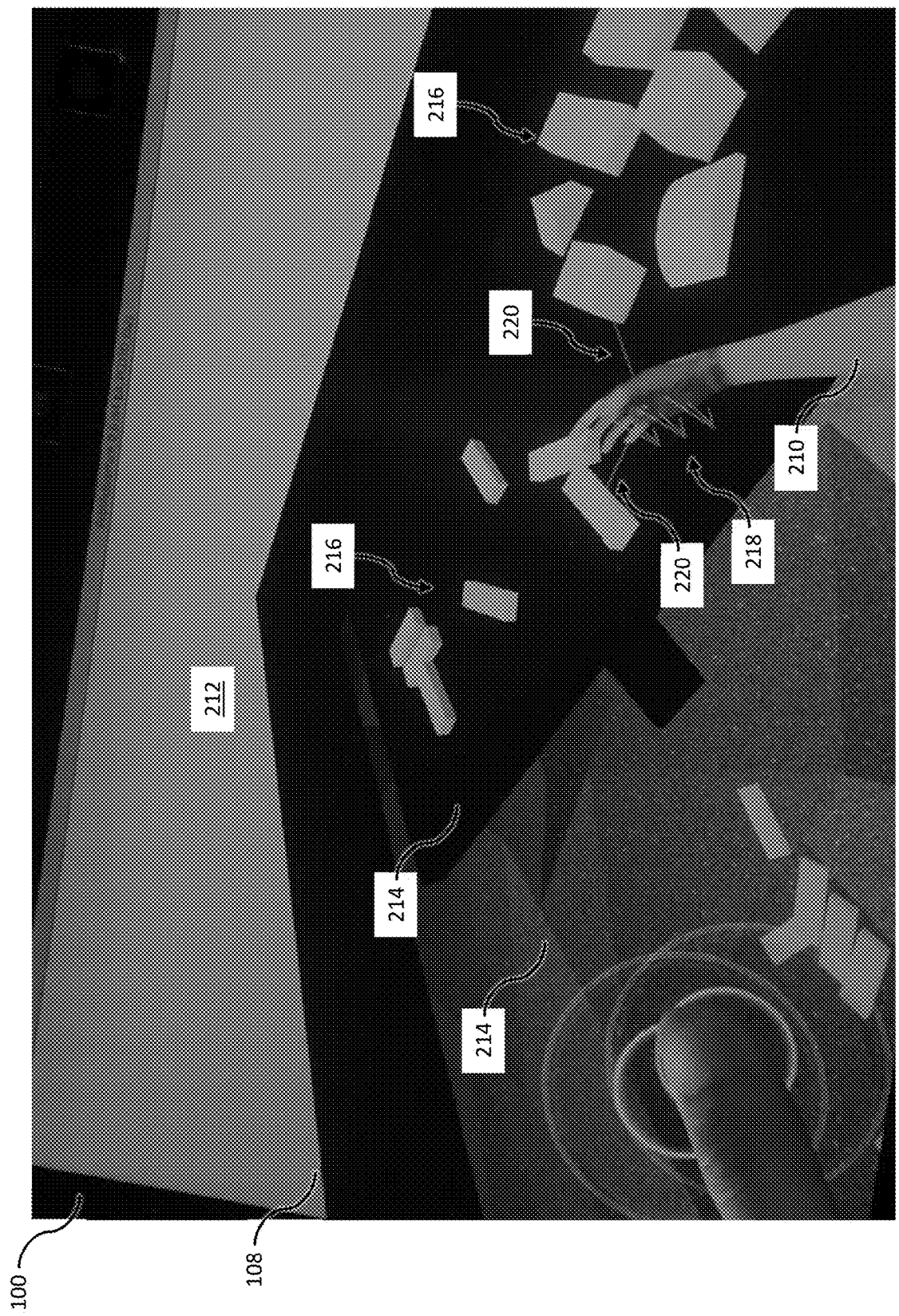
FIG. 10 schematically depicts a scene rendered upon a display of a mobile device according to one or more embodiments shown and described herein.

Referring collectively to FIGS. 9 and 10, the rendered object 210 can be displayed with a scene 212 upon the display 100. The scene 212 can comprise one or more scene objects 214 that cannot be manipulated by the rendered object 210. For example, the one or more scene objects 214 can comprise landscape, immovable objects, moving objects or the like. Alternatively or additionally, the scene 212 can comprise one or more interaction objects 216 that can be manipulated by the rendered object 210. For example, the one or more interaction objects 216 can comprise blocks that can be lifted, pushed, or pulled using the rendered object 210.

The method 200 can comprise a process 206 for providing situation awareness. At process 206, one or more reference rays 218 can be rendered upon the display 108 of the mobile device 100. The reference rays 218 can be configured to provide visual feedback indicative of the relative positioning between the rendered object 210 and one of the scene objects 214. In some embodiments, the scene object 214 can serve as a datum within the scene 210. Accordingly, each of the reference rays 218 can project from the datum location to a position upon the rendered object 210. As the rendered object 210 moves within the scene, the length and angle of the reference rays 218 can change accordingly. Thus, the change in length and orientation of the reference rays 218 can serve as visual feedback of the correlation between motion of the arm 60 and the rendered object 210 within the scene 212. For example, the reference rays 218 can be provided with respect to a horizontal surface to depict height information, e.g., height relative to a floor, table, and the like. Applicants have discovered that such visual feedback has improved the interaction of users with three dimensional scenes. It is noted that, while the scene 212 is depicted as comprising nine reference rays 218, the embodiments described herein can comprise any number of reference rays 218 suitable to provide visual feedback. It is furthermore noted that the reference rays can be provided between the rendered object 210 and any number of the scene objects 214.

Alternatively or additionally, at process 206, one or more object rays 220 can be rendered upon the display 108 of the mobile device 100. The object rays 220 can be configured to provide visual feedback indicative of the distance between the rendered object 210 and one of the interaction objects 216. In some embodiments, an object ray 220 can extend between the interaction object 216 nearest to the rendered object 210 and the rendered object 210. As the rendered object 210 moves within the scene and while the interaction object 216 remains constant, the length and angle of the object ray 220 can change accordingly. Additionally, when a different one of the interaction objects 216 becomes the nearest of the interaction objects 216, the object ray 220 can emanate from the different one of the interaction objects 216. Object rays 220 can be provided from additional ones of the interaction objects 216 such as, for example, the second nearest, the third nearest, etc. In some embodiments, the object rays 220 can be color coded based upon their rank. Optionally, the interaction objects 216 can be color coded based upon distance from the rendered object 210. For example, interaction objects 216 within a predefined range can change color or the nearest of the interaction object(s) 216 can change color.

Alternatively or additionally, at process 206, the rendered object 210, the scene 212 or both can be rendered from different views to depict perspective. For example, the scene can be rendered according to one or more virtual camera to provide three dimensional perspective. The position of a virtual cameras utilized to provide rendering can be moved between multiple positions in a manner analogous to alternating head position of the viewer. In some embodiments, the touch input of the display 108 can receive user tactile input to control movement of the rendered object 210 relative to the scene 212, i.e., the touch screen gestures can be utilized to navigate throughout an environment.

Figure 11:
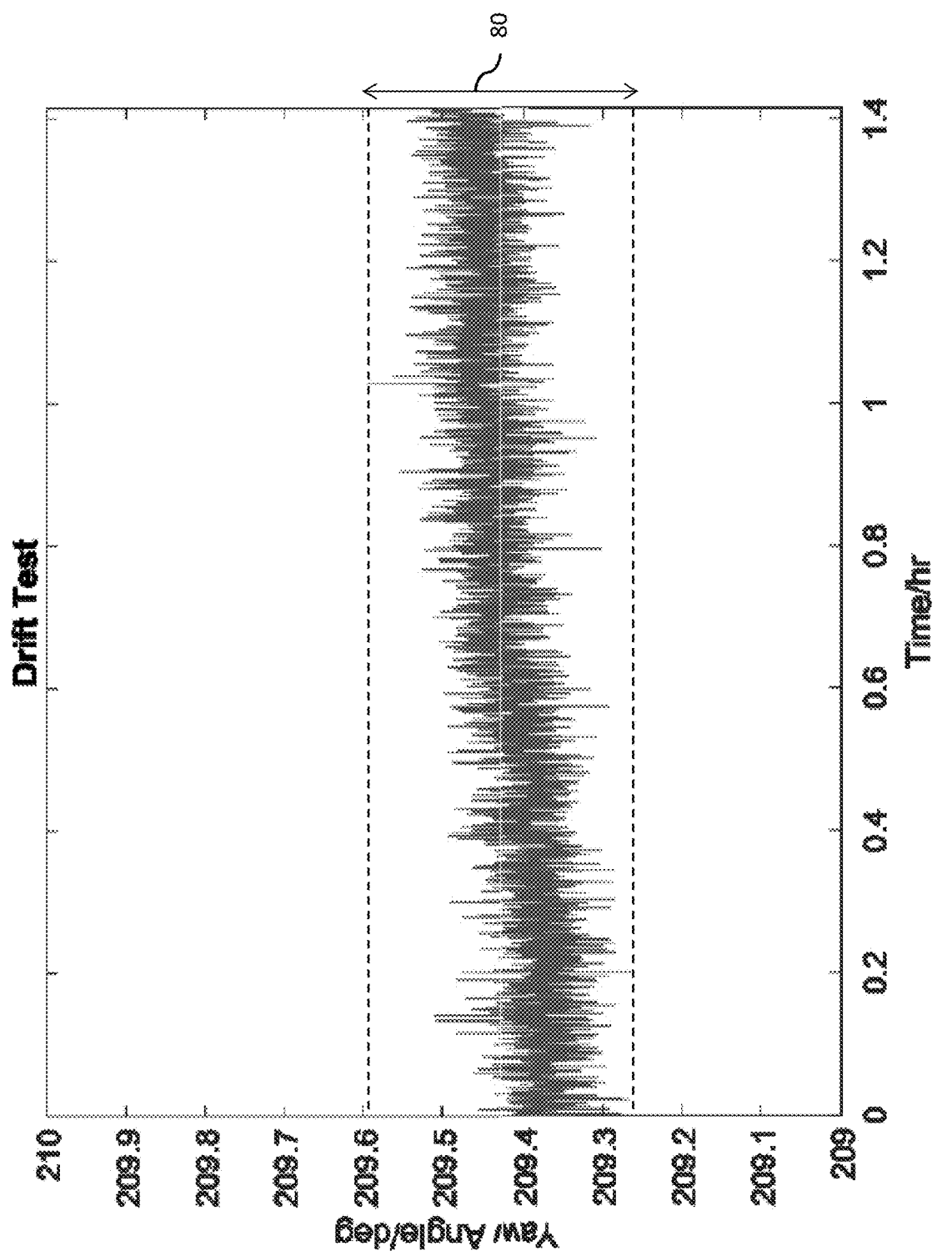
FIG. 11 schematically depicts results of drift testing according to one or more embodiments shown and described herein.

Referring collectively to FIGS. 3 and 11, an embodiment of the master IMU 20 was tested for drift performance. The master IMU 20 executed a modified version of the Madgwick Sensor Fusion Algorithm where floating point arithmetic functions and square root functions were replaced with fixed point functions. Operation of the modified algorithm was synchronized to the gyroscopic sampling rate. The master IMU 20 was calibrated and the offset calibration routine was performed prior to collecting drift measurements. The drift measurements depicted in FIG. 11 were collected from a statically positioned master IMU 20. The master IMU 20 was placed upon a wooden jig supported by a flat non-ferromagnetic surface with the Y-axis of the IMU sensor 28 aligned vertical, i.e., along the normal of the surface. The jig was configured to position the master IMU at an absolute angle with respect to magnetic North. The test was repeated in an indoor environment having metallic objects within the room, and outdoors in a location segregated from metallic objects. The test results were independent of the indoor and outdoor environments.

FIG. 11 depicts the absolute yaw angle data sampled at a rate of one sample per second for 1.4 hours. The yaw angle slope of a best fit linear curve demonstrated relatively little drift over time, i.e., less than about 0.2 degree per hour. Specifically, testing demonstrated a yaw angle slope of about less than about 0.1 degrees per hour, or about 0.07 degrees per hour. Additionally, peak-to-peak drift 80 demonstrated relatively little drift over time, i.e., less than about 0.6 degrees throughout an hour. Specifically, testing demonstrated peak-to-peak drift 80 of less than about 0.5 throughout an hour, or about 0.35 degrees throughout an hour. Accordingly, the embodiments described herein can substantially eliminate drift induced errors and improve fine motion detection, which can in turn improve user interaction in game play, augmented reality, or virtual reality simulations.

It should now be understood that the embodiments described herein can be utilized to provide an extension of user's arm that can appear to reach within a three dimensional scene displayed upon a mobile device. Thus, the arm motion can intuitively grab, move, manipulate and hit objects within the scene in ways not possible with existing devices. For example, objects can be grabbed, moved or hit from directions originating from behind the object as well as from other directions by capturing fluid and natural arm movements. The fluidity of the user's movement can be enhanced by feedback provided by the situational awareness software components. Moreover, the embodiments described herein can utilize small, lightweight, and wireless sensors, which can reduce cost and improve adoption by users. The sensors can additionally include BLE communication, which provides not only a long battery life, but also a gateway to mobile devices as well as an integration path to the Internet of Things. Moreover, the BLE communication provides a communication path to integrate the IMU devices described herein with augmented reality devices, or virtual reality devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A device comprising:
an inertial measurement unit (IMU) sensor comprising an accelerometer, a gyroscope and a magnetometer, the IMU sensor configured to generate orientation information, and further configured to generate respective periodic interrupt signals triggered by falling edges of respective events on respective separate dedicated interrupt channels, wherein the accelerometer generates periodic accelerometer interrupt signals triggered by first falling edges of first events on a first dedicated interrupt channel, the gyroscope generates periodic gyroscope interrupt signals triggered by second falling edges of second events on a second dedicated interrupt channel, and the magnetometer generates periodic magnetometer interrupt signals triggered by third falling edges of third events on a third dedicated interrupt channel, and wherein an offset and scale of the gyroscope, an offset and scale of the accelerometer and an offset and scale of the magnetometer are calibrated to a known acceleration, magnetic field and angular velocity to correct for errors prior to processing the orientation information using a fusion algorithm; and
an IMU processor coupled to the IMU sensor and configured to execute machine-readable instructions stored in a non-transitory computer readable medium, wherein the machine-readable instructions cause the IMU processor, upon receiving through the respective separate dedicated first, second and third interrupt channels, the respective periodic interrupt signals triggered by the first, second and third falling edges of the respective first, second and third events of the accelerometer, the gyroscope and the magnetometer during an interval of time between neighboring interrupt signals of the respective periodic interrupt signals generated by the IMU sensor, to:
retrieve the orientation information generated by the accelerometer, the gyroscope and the magnetometer of the IMU sensor; and
apply the orientation information to the fusion algorithm to generate an orientation signal indicative of at least an orientation of the device, wherein the orientation signal has peak-to-peak drift of less than 0.6 degrees throughout an hour, and wherein the orientation signal has a yaw angle drift slope of less than 0.2 degrees per hour, when the device is statically positioned.

2. The device of claim 1, wherein a time interval length of the interval of time between neighboring interrupt signals of the respective periodic interrupt signals is according to an event rate of the IMU sensor.

3. The device of claim 2, wherein the event rate defines a rate over time at which the IMU sensor generates respective periodic interrupt signals.

4. The device of claim 1, wherein the machine-readable instructions further cause the IMU processor to receive an interrupt signal of the respective periodic interrupt signals, and wherein to retrieve the orientation information generated by the IMU sensor comprises retrieving the orientation information generated by the IMU sensor in response to receiving the periodic interrupt signals prior to receiving subsequent periodic interrupt signals.

5. The device of claim 4, wherein the respective periodic interrupt signals comprise a set of respective periodic interrupt signals, wherein each set of the respective periodic interrupt signals corresponds to one of the accelerometer periodic interrupt signals, the gyroscope periodic interrupt signals, and the magnetometer periodic interrupt signals.

6. The device of claim 5, wherein the machine-readable instructions further cause the IMU processor to transmit the orientation signal to communication hardware of the device configured to wirelessly transmit the orientation signal to another device.

7. The device of claim 5, wherein the accelerometer, magnetometer and the gyroscope generate each set of the periodic interrupt signals at a different rate over time.

8. The device of claim 5, wherein the accelerometer periodic interrupt signals are generated at a given rate of 200 Hz over time, the gyroscope periodic interrupt signals are generated at another rate of 190 Hz over time, and the magnetometer periodic interrupt signals are generated at a further rate of 50 Hz over time.

9. The device of claim 1, wherein the fusion algorithm comprises a gradient descent method, and wherein the gradient descent method is based on fix point math functions.

10. The device of claim 1, wherein the machine-readable instructions further cause the IMU processor to enter into a power saving state.

11. The device of claim 1, wherein the orientation signal is further indicative of one of an acceleration of the device, and a combination of the orientation and the acceleration of the device.

12. The device of claim 1, further comprising calibrating to correct for a scale error of at least one of the accelerometer and the magnetometer prior to processing the orientation information using a fusion algorithm.

13. A system comprising:
a first inertial measurement unit (IMU) device including a first IMU processor and a first IMU sensor including a first accelerometer, a first gyroscope and a first magnetometer and a second IMU device including a second IMU processor and a second IMU sensor including a second accelerometer, a second gyroscope and a second magnetometer, wherein an offset and scale of the first gyroscope and the second gyroscope, an offset and scale of the first accelerometer and the second accelerometer and an offset and scale of the first magnetometer and the second magnetometer are calibrated to a known acceleration, magnetic field and angular velocity to correct for errors prior to processing orientation information using a fusion algorithm;
wherein the first accelerometer and the second accelerometer are configured to generate respective first periodic accelerometer interrupt signals, the first gyroscope and the second gyroscope are configured to generate respective second periodic gyroscope interrupt signals, and the first magnetometer and the second magnetometer are configured to generate respective third periodic magnetometer interrupt signals to generate orientation information for a respective IMU device wherein at least one of the first IMU processor of the first IMU device and the second IMU processor of the second IMU device upon receiving through respective separate dedicated interrupt channels, the respective first, second and third periodic interrupt signals triggered by falling edges of respective events of the accelerometer, the gyroscope and the magnetometer, wherein during an interval of time between neighboring interrupt signals of the respective first, second and third periodic interrupt signals generated by the IMU sensor, the second IMU processor of the second IMU device is configured apply the orientation information to the fusion algorithm to generate an orientation signal; and
a mobile device comprising memory, one or more processors and a display coupled to the one or more processors, wherein the memory stores machine-readable instructions, and the one or more processors is configured to retrieve the stored machine-readable instructions and execute the machine-readable instructions to:
receive the orientation signal indicative of at least the orientation of the first IMU device and the second IMU device;
render a scene on the display comprising a rendered object based on the orientation signal, wherein the scene further comprises a non-interactive object and an interactive object; and
manipulate the interactive object by the rendered object based on the orientation signal.

14. The system of claim 13, wherein each of the first IMU device and the second IMU device is configured to generate a respective orientation signal indicative of at least an orientation of a corresponding IMU device based on their respective generated orientation information.

15. The system of claim 13, wherein one of the first IMU device and the second IMU device comprises an ANT wireless module configured to wirelessly transmit the orientation signal to the mobile device.

16. The system of claim 15, wherein the orientation signal is further indicative of one of an acceleration of the first IMU device and the second IMU device.

17. The system of claim 16, wherein the first IMU device is positioned relative to a first body region, and the second IMU is positioned relative to a second body region, and wherein the orientation signal is representative of at least an orientation of the first body region and the second body region.

18. The system of claim 17, wherein the first body region comprises a bicep region and the second body region comprises one of a forearm region, a palm region, and a waist region.

19. The system of claim 18, wherein each of the first IMU device and the second IMU device comprise an attachment member configured to secure an IMU device to a corresponding body region.

20. The system of claim 19, wherein the first body region is from a human, and the second body region is one of from the first human and a second human.

21. The system of claim 13, wherein the rendered object comprises two elongated members connected at a common location and rendered to move with a similar degree of freedom as the first IMU device and the second IMU device.

22. The system of claim 13, wherein to manipulate the interactive object comprises one of lifting, pushing, and pulling.

23. The system of claim 13, wherein the scene further comprises one or more reference rays to provide visual feedback indicative of a position of the rendered object relative to the non-interactive object.

24. The system of claim 23, wherein the non-interactive object is a datum within the scene, and wherein the one or more reference rays project from the datum to a position on the rendered object.

25. The system of claim 13, wherein the scene comprises one or more object rays, wherein the one or more object rays provide visual feedback indicative of distance between the rendered object and the interactive object.

26. The system of claim 25, wherein the one or more object rays extend between the interactive object nearest to the rendered object and the rendered object.

27. The system of claim 13, wherein the interactive object is color coded based on a distance relative to the rendered object.

28. The system of claim 13, further comprising a third IMU device configured to generate orientation information for the third IMU device, and wherein the orientation signal is further generated based on the orientation information for the third IMU device, and wherein the orientation signal is indicative of at least the orientation of the first IMU device, the second IMU device, and the third IMU device.

29. The system of claim 28, wherein the second IMU device is positioned relative to a forearm region, and the third IMU device is positioned relative to one of a palm region or a waist region.

30. The system of claim 29, further comprising a fourth IMU device configured to generate orientation information for the fourth IMU device, and wherein the orientation signal is further generated based on the orientation information for the fourth IMU device, and wherein the orientation signal is indicative of at least the orientation of the first IMU device, the second IMU device, the third IMU device, and the fourth IMU device.

31. The system of claim 30, wherein the second IMU device is positioned relative to a forearm region of a first arm, the third IMU device is positioned relative to a biceps region of a second arm, and the fourth IMU device is positioned relative to a forearm region of the second arm.

32. A system comprising:
a device comprising:
an inertial measurement unit (IMU) sensor comprising an accelerometer, a gyroscope and a magnetometer, the IMU sensor configured to generate orientation information for the device, and further configured to generate a plurality of interrupt signals on separate dedicated interrupt channels over time based on an event frequency, wherein the IMU sensor which comprises the accelerometer configured to generate accelerometer periodic first interrupt signals, the gyroscope configured to generate gyroscope periodic second interrupt signals, and the magnetometer configured to generate magnetometer periodic third interrupt signals, and wherein an offset and scale of the gyroscope, an offset and scale of the accelerometer and an offset and scale of the magnetometer are calibrated to a known acceleration, magnetic field and angular velocity to correct for errors prior to processing the orientation information using a fusion algorithm, and
an IMU processor coupled with the IMU sensor and connected with a non-transitory computer readable medium, the IMU processor upon receiving through respective separate dedicated interrupt channels, respective periodic interrupt signals triggered by falling edges of respective events of the accelerometer, the gyroscope and the magnetometer, configured to operate in an operating state and a stand-by state, wherein during an interval of time between neighboring interrupt signals of the respective periodic interrupt signals, the IMU processor being further configured to execute machine-readable instructions stored in the non-transitory computer readable medium, wherein the machine-readable instructions cause the IMU processor in the operating state to apply the calibrated orientation information to the fusion algorithm to generate an orientation signal indicative of at least an orientation of the device.

33. The system of claim 32,
wherein the machine-readable instructions further cause the IMU processor in a second operating state of the plurality of different operating states to transmit the orientation signal to communication hardware of the device configured to wirelessly transmit the orientation signal during the interval of time between neighboring interrupt signals of the respective periodic interrupt signals; and
further comprising a mobile device configured to receive the wirelessly transmitted orientation signal, and further configured to manipulate an application executing thereon based on the wirelessly transmitted orientation signal.

34. The system of claim 33, wherein the machine-readable instructions further cause the IMU processor to enter into a third operating state of the plurality of different operating states, wherein in the third operating state the IMU processor is configured to consume less power than in one of the first operating state, the second operating state, and a combination thereof.

35. The system of claim 34, wherein the machine-readable instructions further cause the IMU processor in the first operating state to receive an interrupt signal of the periodic interrupt signals, and retrieve the orientation information generated by the IMU sensor in response to receiving the interrupt signal.

36. The system of claim 32,
wherein the device is a first device; and
further comprising a second device configured to generate orientation information for the second device, and wherein to generate the orientation signal according to the fusion algorithm based on the orientation information comprises generating an orientation signal indicative of at least an orientation of the first device and the second device according to the fusion algorithm based on the orientation information generated by each respective IMU device.

37. The system of claim 36, further comprising a mobile device comprising memory, one or more processors and a display coupled to the one or more processors, wherein the memory stores machine-readable instructions, and the one or more processors is configured to retrieve the stored machine-readable instructions and execute the machine-readable instructions to:

receive the orientation signal indicative of at least the orientation of the first IMU device and the second IMU device;

render a scene on the display comprising a rendered object based on the orientation signal, wherein the scene further comprises a non-interactive object and an interactive object; and manipulate the interactive object by the rendered object based on the orientation signal.

\* \* \* \* \*